United States Patent [19]

Andrews

[11] 4,239,019

[45] Dec. 16, 1980

[54] MARINE SPECIMEN COLLECTOR

[76] Inventor: Timothy Andrews, 7794 E. Walnut Ave., Ontario, Calif. 91761

[21] Appl. No.: 69,843

[22] Filed: Aug. 27, 1979

[51] Int. Cl.$^3$ .............................................. A01K 79/00
[52] U.S. Cl. ...................................... 119/3; 73/425.6
[58] Field of Search ................... 119/3, 2, 5; 43/1, 6.5, 43/15; 73/425.6

[56]     References Cited
U.S. PATENT DOCUMENTS

| 2,949,882 | 8/1960 | Thomas, Jr. ............................ 119/3 |
| 3,945,254 | 3/1976 | Rebold ................................ 73/425.6 |
| 4,038,945 | 8/1977 | Taborsky ................................. 119/3 |

*Primary Examiner*—Hugh R. Chamblee
*Attorney, Agent, or Firm*—Edward R. Grant

[57]     ABSTRACT

A marine specimen collector havng a container, with front and rear closure, a piston within said container, elastomeric cords biasing said piston toward said rear closure, a sear to hold said piston at a selected position of bias, and a trigger to release said sear and allow said piston to move away from said front closure, whereby water is forced into said container.

4 Claims, 3 Drawing Figures

MARINE SPECIMEN COLLECTOR

This invention relates to a marine life collector and more particularly to a collector which allows the operator to capture specific aquatic fauna and flora. When the operator pulls a trigger a piston retracts within a container, lowering the pressure within the container and allowing ambient water pressure to push water into the container along with the aquatic life in the water.

Underwater divers use various means for collection of marine life in its natural habitat. For example, the speargun is used to kill fish for food or sport. There is a need for an equally convenient means of capturing live fish and other aquatic fauna. Moreover, spearguns, as well as nets and traps, are not adapted to gathering of aquatic flora.

This invention provides for rapid entrapment and containment of a volume of water containing a particular species of marine life. The collector is selective and minimizes damage to the species captured, which is especially important when scientific study is intended.

Accordingly, it is an object of this invention to provide a reliable apparatus for collecting marine plants and animals.

Another object of the invention is to provide an apparatus for capturing alive various forms of aquatic life.

Other objects and advantages will be apparent from the specifications and claims and from the accompanying drawings which illustrate one embodiment of the invention.

Figure 1:
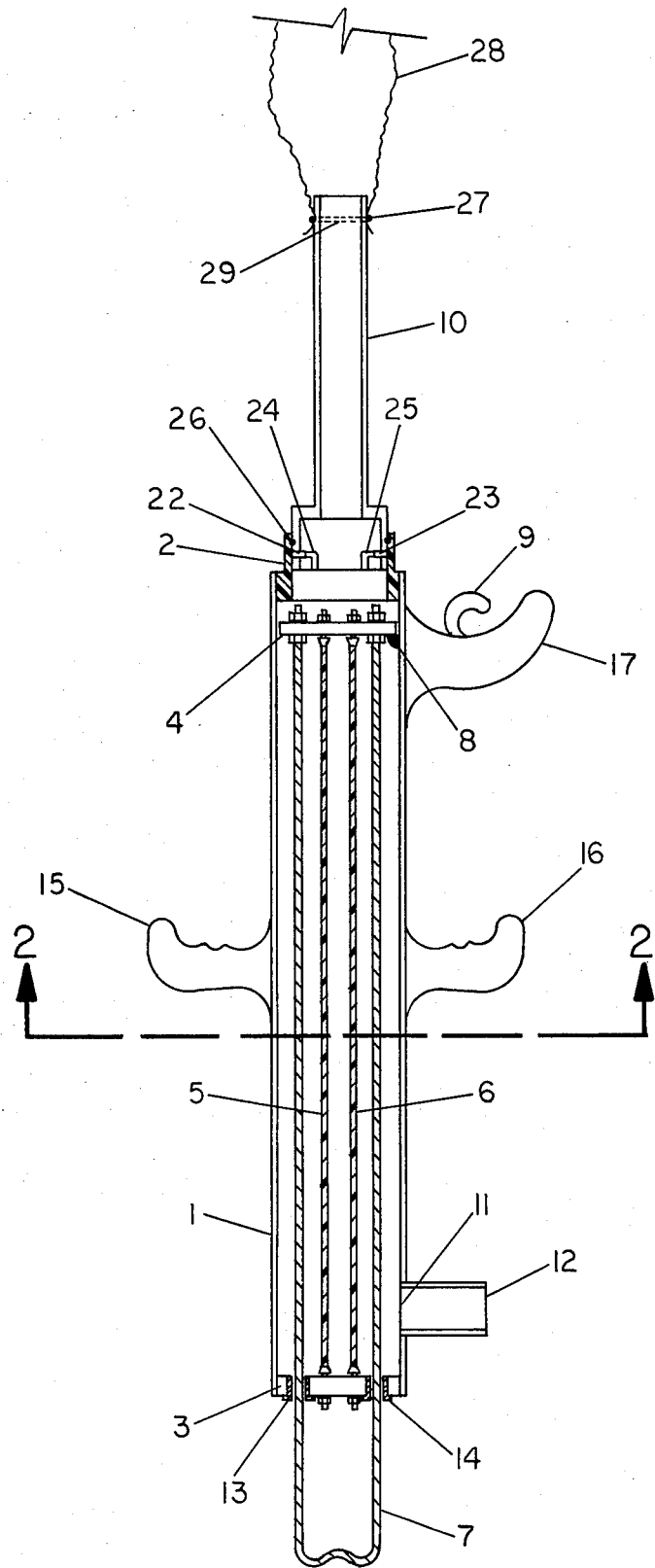
FIG. 1 is a side view partially in section of the marine specimen collector.

Referring to FIG. 1, the marine specimen collector is basically a container comprising cylinder 1, front closure 2, and rear closure 3, within which are a piston 4 and elastomeric cords 5 and 6 biasing said piston toward rear closure 3, a piston rod 7 for positioning said piston within said cylinder, sear 8 to hold said piston at a selected position of bias, and a trigger 9 to disengage said sear from said piston, allowing said elastomeric cords to pull said piston away from front closure 2, causing water to enter the marine collector through nozzle 10 which is in fluid communication with cylinder 1.

In the preferred embodiment cylinder 1, front closure 2 and rear closure 3 are fabricated from a transparent plastic material, such as an acrylic, allowing the operator to see what he has captured. An orifice 11 is located in the wall of cylinder 1 near rear closure 3. Tubular grip member 12 is mounted on cylinder 1, coaxially with orifice 11 in fluid communication with said cylinder. Located in rear closure 3 are bearings 13 and 14 through which piston rod 7 is slideably mounted. Piston 4 is affixed to piston rod 7.

The ends of elastomeric cords 5 and 6 are attached respectively to piston 4 and rear closure 3. Although two cords are utilized in the preferred embodiment it will be recognized that a single cord may be used.

Figure 2:
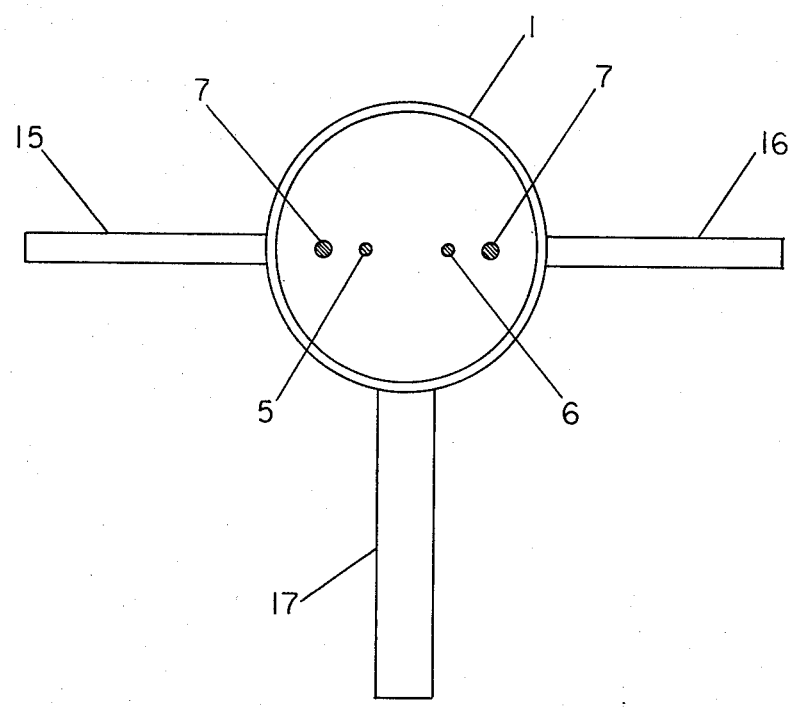
FIG. 2 is a section view toward plane 2—2 of the marine specimen collector illustrated in FIG. 1.

By exerting force against piston rod 7 the operator moves piston 4 to the cocked position shown in FIG. 1, where sear 8 engages said piston and locks it in place. When the piston is locked in this position the marine specimen collector is ready for use. Pull grips 15 and 16 are mounted on cylinder 1 as shown in FIG. 2. In FIG. 1 the position of the pull grips is rotated 90 degrees to show their shape in plan view. When the operator wants to move piston 4 to the cocked position he applies force to piston rod 7 by placing its external end against his body and by pulling the grips with his hands. The external end of the piston rod is arcuately shaped to facilitate holding it against the body.

Figure 3:
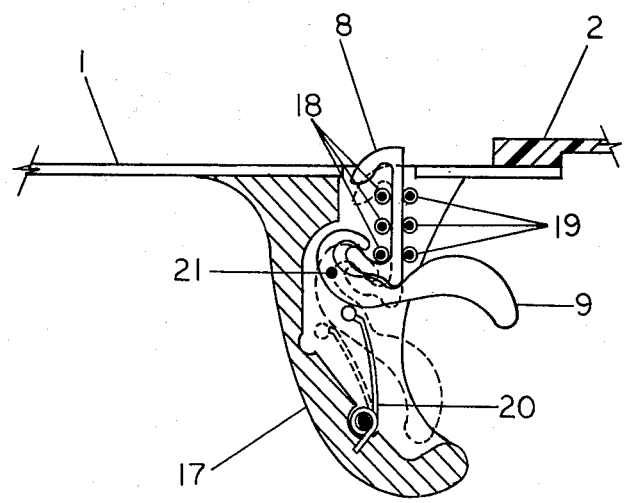
FIG. 3 is a section view of the trigger and sear assembly of the marine specimen collector.

As shown in FIG. 3, sear 8 is slideably mounted in trigger housing 17. Two parallel rows of bearings 18 and 19 bear against the middle portion of said sear, restricting its movement to motion parallel to the face of piston 4. Sleeve bearings such as Rulon Bearings have proved effective in reducing friction and controlling the movement of sear 8. Spring 20 biases trigger 9 counterclockwise about pin 21, tending to force sear 8 toward its cocked position.

Pressure exerted by the operator's fingers against the exposed portion of trigger 9 will pivot it on pin 21, moving the opposite end of the S-shaped trigger downward, pushing sear 8 from the locked position to the dotted release position. As previously described, when the sear is disengaged from the piston, marine life is captured within the water inducted into the collector. The inside diameter of tubular grip member 12 is sized so that movement of piston 4 is damped by flow of water within the container through said tubular grip member. The location and shape of the tubular grip member allows the operator to grip it with one hand, helping him position nozzle 10 near the marine life that is to be captured. The tubular grip member may be omitted without changing the concept of the invention.

Nozzle 10 is detachably mounted in front closure 2 by means of pins 22 and 23, which respectively engage grooves 24 and 25 in said front closure. O-ring 26 provides a seal between nozzle 10 and front closure 2.

After a marine specimen is captured the operator removes o-ring 27, places it over the end of a plastic bag 28, then seats said o-ring again in groove 29, which secures the bag in fluid communication with cylinder 1. The operator then applies force against rod 7 to force the entrapped water into the plastic bag. The bag is removed and tied for storage of the marine specimen.

It will be understood that various changes in the details, materials and arrangements of parts, which have been herein described and illustrated in order to explain the nature of the invention, may be made by those skilled in the art within the principal and scope of the invention as expressed in the following claims.

I claim:

1. A marine specimen collector comprising:
    a nozzle,
    a container having a cylindrical portion and front and rear closures closing the ends of said cylindrical portion, said cylindrical portion having an outlet formed in the wall thereof, said front closure having an inlet formed therein in fluid communication with said nozzle, said rear closure having at least one bearing mounted therein,
    a piston rod slideably mounted in said bearing, the external end thereof being adapted for application of force to said piston rod,
    a piston slideably mounted within said cylindrical portion of said container and affixed to the internal end of said piston rod, said piston being moveable between said inlet and said outlet,
    means biasing said piston toward said rear closure,
    a trigger housing mounted on said cylindrical portion, sear means mounted within said trigger housing for holding said piston in biased position adjacent said inlet, and trigger means mounted in said trigger housing for releasing said sear allowing movement of said piston away from said inlet.

2. A marine specimen collector as in claim 1 wherein said biasing comprise at least one elastomeric cord.

3. A marine specimen collector as in claim 1 wherein said sear and trigger means comprise:
- a housing,
- two parallel rows of sleeve bearings mounted within said housing,
- a sear slideably mounted between said sleeve bearings,
- an S-shaped trigger pivotably mounted within said housing so that said trigger controls movement of said sear, and
- spring means biasing said trigger and sear toward the cocked position.

4. A marine specimen collector comprising:
- a nozzle,
- a container having a cylindrical portion and front and rear closures closing the ends of said cylindrical portion, said cylindrical portion having an outlet formed in the wall thereof, said front closure having an inlet formed therein in fluid communication with said nozzle, said rear closure having at least one bearing mounted therein,
- a tubular grip member mounted on said container in fluid communication with said outlet,
- a piston rod slideably mounted in said bearing, the external end thereof being adapted for application of force to said piston rod,
- a piston slideably mounted within said cylindrical portion of said container and affixed to the internal end of said piston rod, said piston being moveable between said inlet and said outlet,
- means biasing said piston toward said rear closure,
- a trigger housing mounted on said cylindrical portion,
- sear means mounted within said trigger housing for holding said piston in biased position adjacent said inlet, and
- trigger means mounted in said trigger housing for releasing said sear allowing movement of said piston away from said inlet.

* * * * *